(12) United States Patent
He et al.

(10) Patent No.: US 12,093,483 B2
(45) Date of Patent: Sep. 17, 2024

(54) CIRCUIT FOR PERFORMING DISPLAY DRIVING FUNCTION AND FINGERPRINT AND TOUCH DETECTING FUNCTION

(71) Applicant: HIMAX TECHNOLOGIES LIMITED, Tainan (TW)

(72) Inventors: Jia-Ming He, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/051,511

(22) Filed: Oct. 31, 2022

(65) Prior Publication Data

US 2023/0083561 A1     Mar. 16, 2023

Related U.S. Application Data

(62) Division of application No. 17/035,756, filed on Sep. 29, 2020, now Pat. No. 11,520,424.

(51) Int. Cl.
| | | |
|---|---|---|
| *G06F 3/041* | (2006.01) | |
| *G06V 40/13* | (2022.01) | |
| *G06F 3/044* | (2006.01) | |
| *G09G 3/20* | (2006.01) | |

(52) U.S. Cl.
CPC ........ *G06F 3/04166* (2019.05); *G06F 3/0416* (2013.01); *G06V 40/1318* (2022.01); *G06F 3/0412* (2013.01); *G06F 3/041661* (2019.05); *G06V 40/13* (2022.01); *G09G 3/2007* (2013.01);

(Continued)

(58) Field of Classification Search
CPC .. G06F 3/0412; G06F 3/0416; G06F 3/04166; G06F 3/041661; G06V 40/13; G06V 40/1306; G06V 40/1318; G09G 3/2007; G09G 2310/027; G09G 2310/0291
See application file for complete search history.

(56) References Cited

U.S. PATENT DOCUMENTS

| | | |
|---|---|---|
| 8,035,439 B2 | 10/2011 | Chuang et al. |
| 2009/0206850 A1 | 8/2009 | Chuang et al. |

(Continued)

FOREIGN PATENT DOCUMENTS

| | | | | |
|---|---|---|---|---|
| WO | WO-2014208897 A1 * | 12/2014 | ........... | G06F 3/0416 |
| WO | WO-2015115873 A1 * | 8/2015 | ........... | G06F 3/0412 |
| WO | WO-2015133773 A1 * | 9/2015 | ........... | G06F 3/0416 |

*Primary Examiner* — Julie Anne Watko
(74) *Attorney, Agent, or Firm* — CKC & Partners Co., LLC

(57) ABSTRACT

Circuit for performing a display driving function and a fingerprint and touch detecting function includes a unity gain buffer amplifier, an operational amplifier integrator, an ADC circuit, and a digital processing circuit coupled to the ADC circuit. An input terminal of the operational amplifier integrator is coupled to a touch sensor. When the circuit is operated under a display driving mode, an input terminal of the unity gain buffer amplifier receives a gray level voltage and an output terminal of the unity gain buffer amplifier is coupled to a display panel. When the circuit is operated under a fingerprint detecting mode, the input terminal and the output terminal of the unity gain buffer amplifier are respectively coupled to a fingerprint sensor and the ADC circuit. When the circuit is operated under a touch detecting mode, an output terminal of the operational amplifier integrator is coupled to the ADC circuit.

7 Claims, 12 Drawing Sheets

(52) U.S. Cl.
CPC ............... *G09G 2310/027* (2013.01); *G09G 2310/0291* (2013.01)

(56) References Cited

U.S. PATENT DOCUMENTS

| | | | |
|---|---|---|---|
| 2011/0273400 A1* | 11/2011 | Kwon | G06F 3/04166 327/337 |
| 2015/0261542 A1 | 9/2015 | Caulfield | |
| 2017/0286747 A1 | 10/2017 | Kim et al. | |
| 2019/0213374 A1* | 7/2019 | Kwon | G06F 3/0412 |
| 2020/0134285 A1 | 4/2020 | Hung et al. | |
| 2021/0117035 A1* | 4/2021 | Kim | G06V 40/1306 |

\* cited by examiner

CIRCUIT FOR PERFORMING DISPLAY DRIVING FUNCTION AND FINGERPRINT AND TOUCH DETECTING FUNCTION

CROSS REFERENCE

The present application is a Divisional Application of the U.S. application Ser. No. 17/035,756, filed Sep. 29, 2020, which is incorporated herein by reference in its entirety.

BACKGROUND

Field of Invention

The present invention relates to a circuit. More particularly, the present invention relates to a circuit for performing a display driving function and a fingerprint and touch detecting function.

Description of Related Art

The existing mobile phones utilize different separate circuits to realize an image display function, a touch detection function, and a fingerprint recognizing function. For example, a display driving circuit is utilized to control the image to be displayed on the screen. For example, a touch controlling circuit is utilized to detect a position touched by a finger. For example, a fingerprint sensing circuit is utilized to identify a fingerprint of the user. However, the use of more separate circuits for different functions results in increased cost.

SUMMARY

The present invention provides a circuit for performing a display driving function and a fingerprint and touch detecting function. The circuit includes a unity gain buffer amplifier, an operational amplifier integrator, an analog-to-digital converter (ADC) circuit, and a digital processing circuit coupled to the ADC circuit. An input terminal of the unity gain buffer amplifier is controlled to receive a gray level voltage and an output terminal of the unity gain buffer amplifier is controlled to be coupled to a display panel when the circuit is operated under a display driving mode. The input terminal of the unity gain buffer amplifier is controlled to be coupled to a fingerprint sensor when the circuit is operated under a fingerprint detecting mode. An input terminal of the operational amplifier integrator is coupled to a touch sensor. The output terminal of the unity gain buffer amplifier is controlled to be coupled to the ADC circuit when the circuit is operated under the fingerprint detecting mode. An output terminal of the operational amplifier integrator is controlled to be coupled to the ADC circuit when the circuit is operated under a touch detecting mode.

In accordance with one or more embodiments of the invention, the fingerprint sensor is an active pixel sensor (APS).

In accordance with one or more embodiments of the invention, when the circuit is operated under the display driving mode, the circuit is equivalent to a source driver for transmitting the gray level voltage to a source terminal of one of transistors of the display panel via the unity gain buffer amplifier.

In accordance with one or more embodiments of the invention, when the circuit is operated under the fingerprint detecting mode, the ADC circuit receives voltages from the fingerprint sensor via the unity gain buffer amplifier and converts the said voltages into digital signals for recognizing fingerprint.

In accordance with one or more embodiments of the invention, when the circuit is operated under the touch detecting mode, the operational amplifier integrator converts charges from the touch sensor into voltages, and the ADC circuit converts the said voltages into digital signals for recognizing touch events.

In accordance with one or more embodiments of the invention, the circuit further includes a shared pad. The shared pad is controlled to be coupled to the output terminal of the unity gain buffer amplifier when the circuit is operated under the display driving mode. The shared pad is controlled to be coupled to the input terminal of the unity gain buffer amplifier when the circuit is operated under the fingerprint detecting mode.

In accordance with one or more embodiments of the invention, the shared pad is coupled to a source terminal of one of transistors of the display panel and a source terminal of a select transistor of the fingerprint sensor. A gate terminal of the one of the transistors of the display panel is controlled to receive a high voltage signal when the circuit is operated under the display driving mode. A gate terminal of the select transistor of the fingerprint sensor is controlled to receive the high voltage signal when the circuit is operated under the fingerprint detecting mode.

The present invention further provides a circuit for performing a display driving function and a fingerprint and touch detecting function. The circuit includes an operational amplifier, a second operational amplifier integrator, an ADC circuit, and a digital processing circuit coupled to the ADC circuit. The operational amplifier is controlled to be formed as a unity gain buffer amplifier and an input terminal of the unity gain buffer amplifier is controlled to receive a gray level voltage and an output terminal of the unity gain buffer amplifier is controlled to be coupled to a display panel when the circuit is operated under a display driving mode. The operational amplifier is controlled to be formed as a first operational amplifier integrator and an input terminal of the first operational amplifier integrator is controlled to be coupled to a fingerprint sensor when the circuit is operated under a fingerprint detecting mode. An input terminal of the second operational amplifier integrator is coupled to a touch sensor. An output terminal of the first operational amplifier integrator is controlled to be coupled to the ADC circuit when the circuit is operated under the fingerprint detecting mode. An output terminal of the second operational amplifier integrator is controlled to be coupled to the ADC circuit when the circuit is operated under a touch detecting mode.

In accordance with one or more embodiments of the invention, the fingerprint sensor is a passive pixel sensor (PPS).

In accordance with one or more embodiments of the invention, when the circuit is operated under the display driving mode, the circuit is equivalent to a source driver for transmitting the gray level voltage to a source terminal of one of transistors of the display panel via the unity gain buffer amplifier.

In accordance with one or more embodiments of the invention, when the circuit is operated under the fingerprint detecting mode, the first operational amplifier integrator converts charges from the fingerprint sensor into voltages, and the ADC circuit converts the said voltages into digital signals for recognizing fingerprint.

In accordance with one or more embodiments of the invention, when the circuit is operated under the touch detecting mode, the second operational amplifier integrator converts charges from the touch sensor into voltages, and the ADC circuit converts the said voltages into digital signals for recognizing touch events.

In accordance with one or more embodiments of the invention, the circuit further includes a shared pad. The shared pad is controlled to be coupled to the output terminal of the unity gain buffer amplifier when the circuit is operated under the display driving mode. The shared pad is controlled to be coupled to the input terminal of the first operational amplifier integrator when the circuit is operated under the fingerprint detecting mode.

In accordance with one or more embodiments of the invention, the shared pad is coupled to a source terminal of one of transistors of the display panel and a source terminal of a select transistor of the fingerprint sensor. A gate terminal of the one of the transistors of the display panel is controlled to receive a high voltage signal when the circuit is operated under the display driving mode. A gate terminal of the select transistor of the fingerprint sensor is controlled to receive the high voltage signal when the circuit is operated under the fingerprint detecting mode.

The present invention further provides a circuit for performing a display driving function and a fingerprint and touch detecting function. The circuit includes a first unity gain buffer amplifier, an operational amplifier, an ADC circuit, and a digital processing circuit coupled to the ADC circuit. An input terminal of the first unity gain buffer amplifier receives a gray level voltage and an output terminal of the first unity gain buffer amplifier is coupled to a display panel. An input terminal of the operational amplifier is controlled to be coupled to a fingerprint sensor when the operated under a fingerprint detecting mode. The operational amplifier is controlled to be formed as a first operational amplifier integrator and an input terminal of the first operational amplifier integrator is controlled to be coupled to a touch sensor when the circuit is operated under a touch detecting mode. An output terminal of the operational amplifier is coupled to the ADC circuit.

In accordance with one or more embodiments of the invention, the fingerprint sensor is an active pixel sensor (APS). The operational amplifier is controlled to be formed as a second unity gain buffer amplifier when the operated under the fingerprint detecting mode.

In accordance with one or more embodiments of the invention, the fingerprint sensor is a passive pixel sensor (PPS). The operational amplifier is controlled to be formed as a second operational amplifier integrator when the operated under the fingerprint detecting mode.

In accordance with one or more embodiments of the invention, when the circuit is operated under a display driving mode, the circuit is equivalent to a source driver for transmitting the gray level voltage to a source terminal of one of transistors of the display panel via the first unity gain buffer amplifier.

In accordance with one or more embodiments of the invention, when the circuit is operated under the fingerprint detecting mode, the ADC circuit receives voltages from the operational amplifier and converts the said voltages into digital signals for recognizing fingerprint.

In accordance with one or more embodiments of the invention, when the circuit is operated under the touch detecting mode, the first operational amplifier integrator converts charges from the touch sensor into voltages, and the ADC circuit converts the said voltages into digital signals for recognizing touch events.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Specific embodiments of the present invention are further described in detail below with reference to the accompanying drawings, however, the embodiments described are not intended to limit the present invention and it is not intended for the description of operation to limit the order of implementation. The using of "first", "second", "third", etc. in the specification should be understood for identify units or data described by the same terminology, but are not referred to particular order or sequence.

Figure 1A:
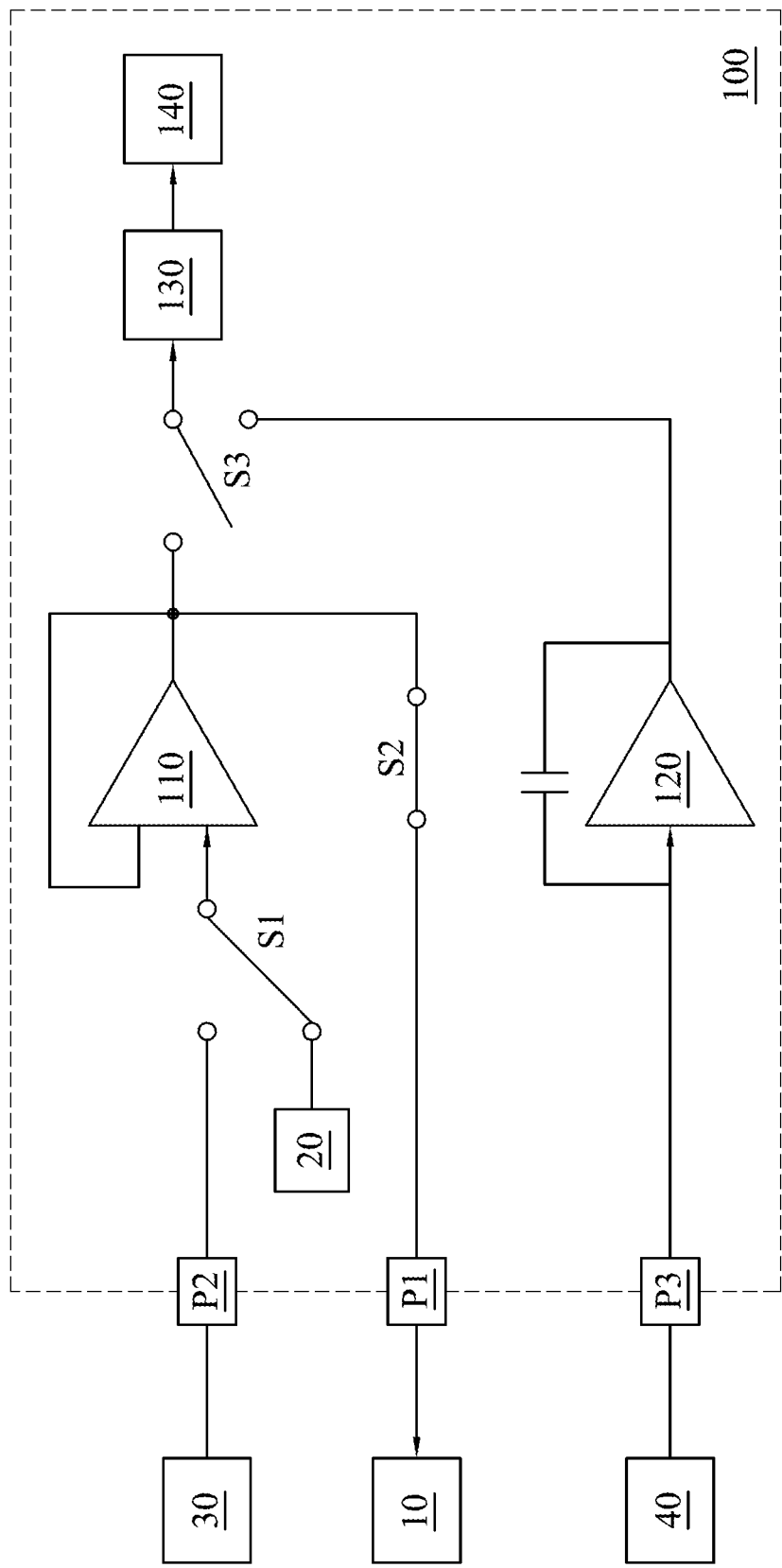
FIGS. 1a-1c illustrate block diagrams of a circuit for performing a display driving function and a fingerprint and touch detecting function according to a first embodiment of the present invention.
Figure 1B:
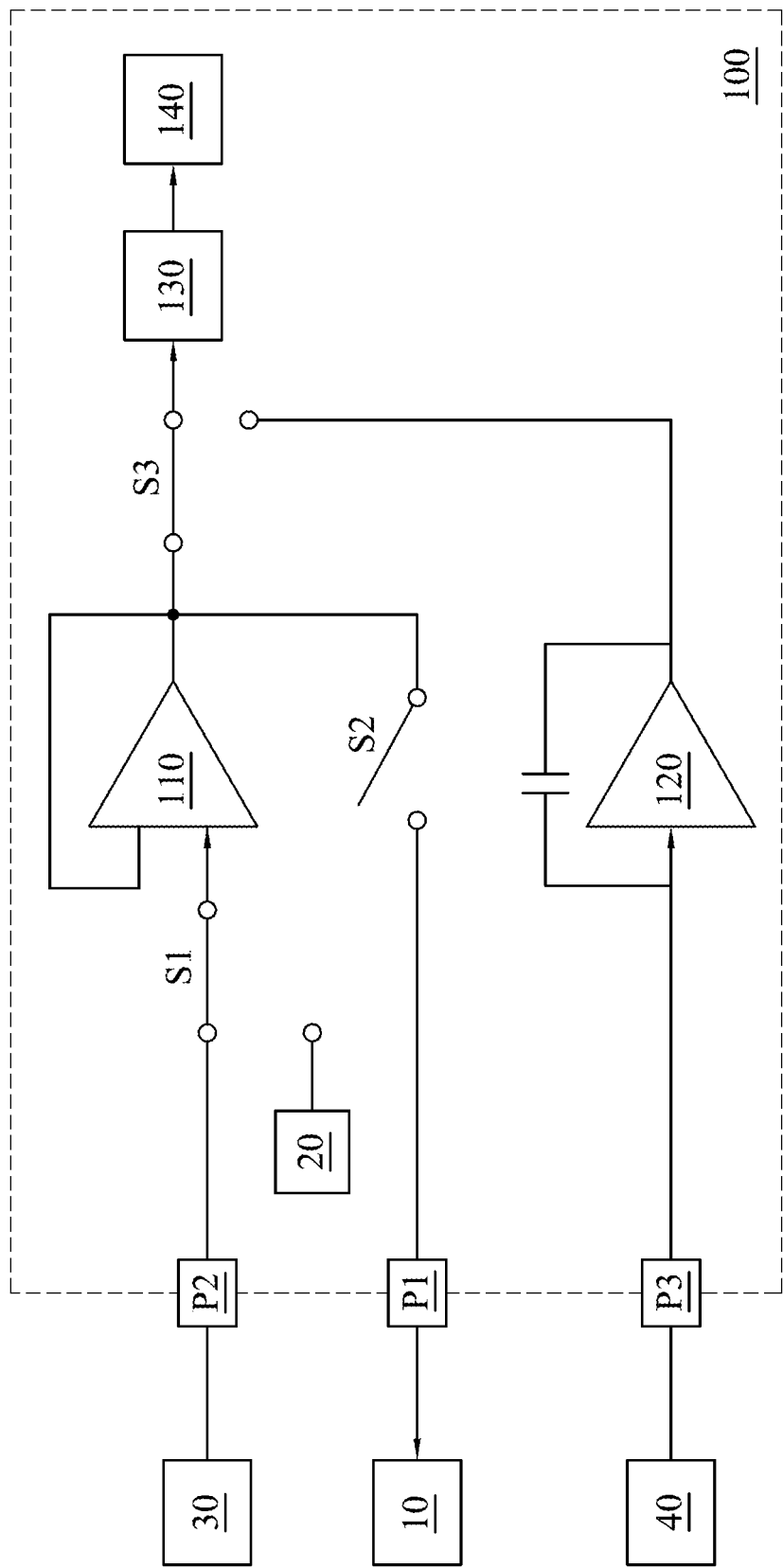
Figure 1C:
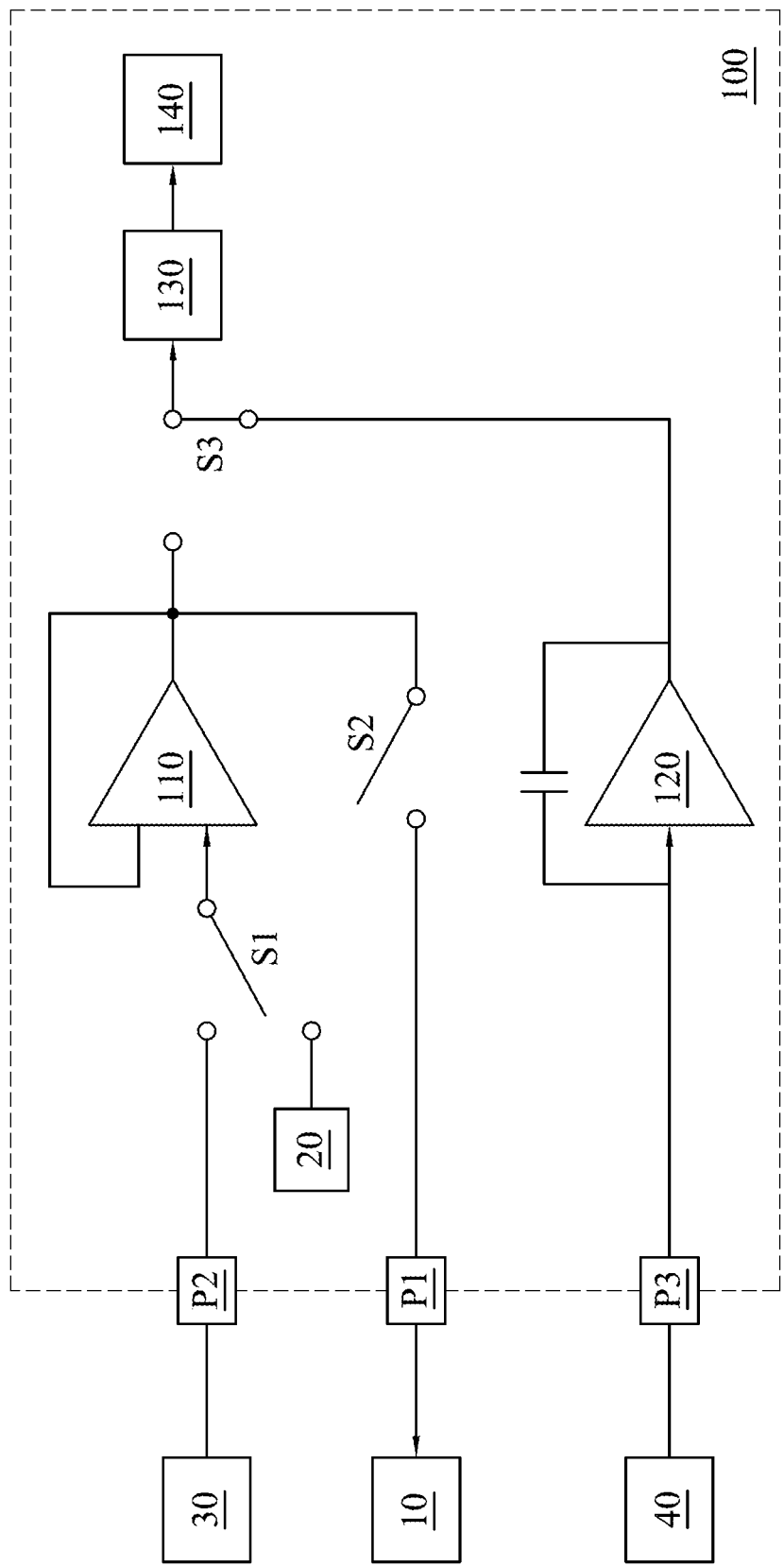

FIGS. 1a-1c illustrate block diagrams of a circuit 100 for performing a display driving function and a fingerprint and touch detecting function according to a first embodiment of the present invention. The circuit 100 includes a unity gain buffer amplifier 110, an operational amplifier integrator 120, an analog-to-digital converter (ADC) circuit 130, and a digital processing circuit 140 coupled to the ADC circuit 130.

FIG. 1a shows a connection diagram when the circuit 100 is operated under a display driving mode. As shown in FIG. 1a, when the circuit 100 is operated under the display driving mode, three switches S1-S3 are controlled, such that an input terminal of the unity gain buffer amplifier 110 is coupled to a gamma circuit 20 and an output terminal of the unity gain buffer amplifier 110 is coupled to a display panel 10 via a pad P1. The gamma circuit 20 provides a gray level voltage corresponding to a grayscale value of input image. Specifically, when the circuit 100 is operated under the display driving mode, the circuit 100 transmits the gray level voltage to a source terminal of one of transistors (not shown) of the display panel 10 via the unity gain buffer amplifier 110, such that the circuit 100 is equivalent to a source driver to control the input image to be displayed on the display panel 10.

FIG. 1b shows a connection diagram when the circuit 100 is operated under a fingerprint detecting mode. As shown in FIG. 1b, when the circuit 100 is operated under the fingerprint detecting mode, three switches S1-S3 are controlled, such that the input terminal of the unity gain buffer amplifier 110 is coupled to a fingerprint sensor 30 via a pad P2 and the output terminal of the unity gain buffer amplifier 110 is coupled to the ADC circuit 130. The fingerprint sensor 30 provides voltages corresponding to a fingerprint of a user. Specifically, when the circuit 100 is operated under the fingerprint detecting mode, the circuit 100 transmits the said voltages from the fingerprint sensor 30 to the ADC circuit 130 via the unity gain buffer amplifier 110, and the ADC circuit 130 converts the said voltages to digital signals, and the digital processing circuit 140 receives and processes the digital signals, such that the circuit 100 is equivalent to a fingerprint sensing circuit for recognizing fingerprint.

FIG. 1c shows a connection diagram when the circuit 100 is operated under a touch detecting mode. As shown in FIG. 1c, an input terminal of the operational amplifier integrator 120 is coupled to a touch sensor 40 via a pad P3. The touch sensor 40 provides the stored charges corresponding to touch events. As shown in FIG. 1c, when the circuit 100 is operated under the touch detecting mode, three switches S1-S3 are controlled, such that an output terminal of the operational amplifier integrator 120 is coupled to the ADC circuit 130. Specifically, when the circuit 100 is operated under the touch detecting mode, the operational amplifier integrator 120 converts the stored charges into voltages, and the ADC circuit 130 converts the said voltages to digital signals, and the digital processing circuit 140 receives and processes the digital signals, such that the circuit 100 is equivalent to a touch controlling circuit for recognizing the touch events.

It is noted that the display driving mode, the fingerprint detecting mode, and the touch detecting mode are operated at different times, and therefore the electrical component such as the unity gain buffer amplifier 110 could be shared when the circuit 100 is operated under different operation modes. In some other embodiments of the present invention, the fingerprint sensor 30 and the touch sensor 40 may be integrated within the display panel 10. In the first embodiment of the present invention, the unity gain buffer amplifier 110 is shared when the circuit 100 is operated under the display driving mode and the fingerprint detecting mode, and the ADC circuit 130 and the digital processing circuit 140 are shared when the circuit 100 is operated under the fingerprint detecting mode and the touch detecting mode, and therefore the cost for manufacturing the circuit 100 for performing a display driving function and a fingerprint and touch detecting function could be decreased.

Figure 2:
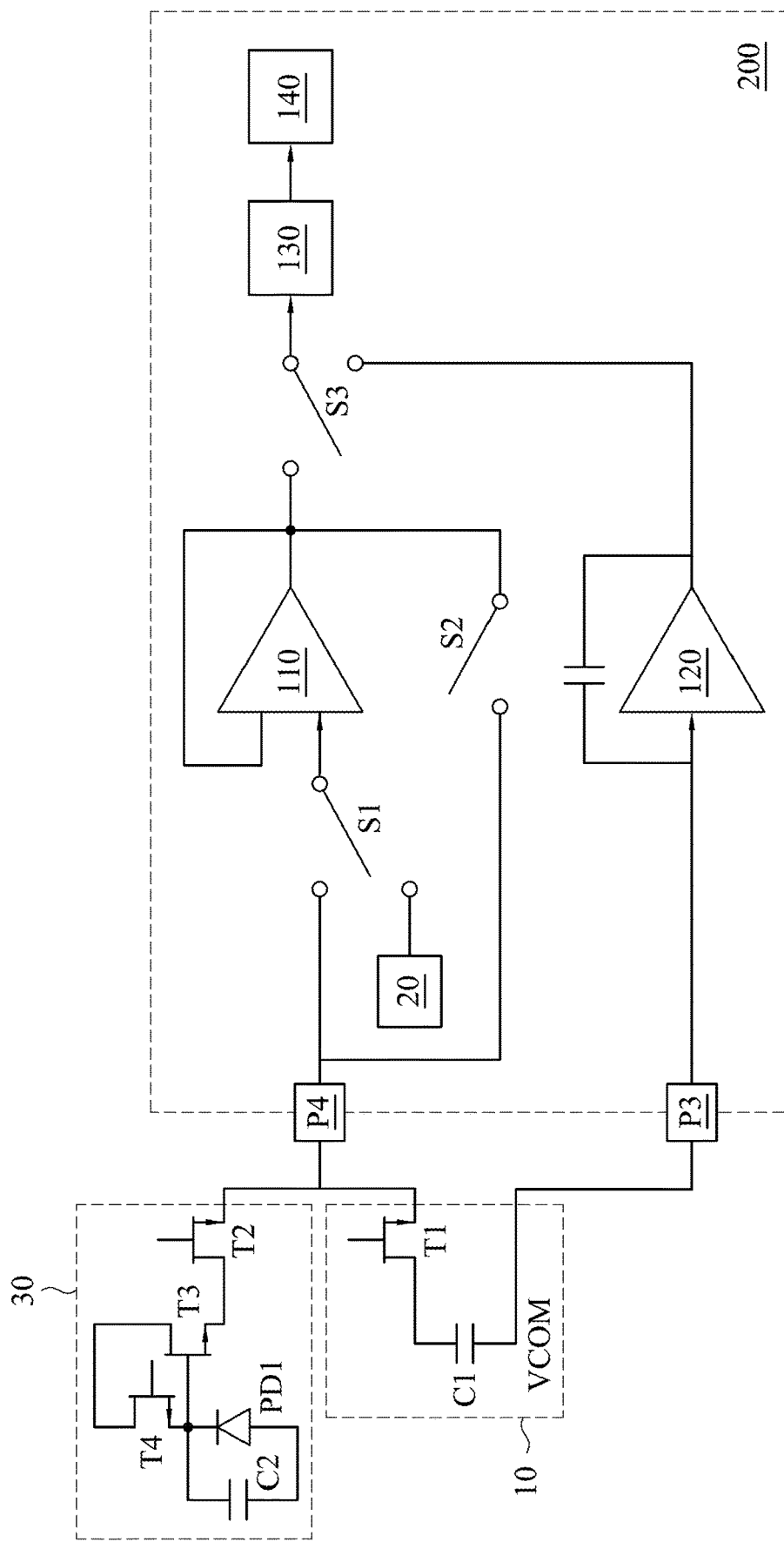
FIG. 2 illustrates a block diagram of a circuit for performing a display driving function and a fingerprint and touch detecting function according to a second embodiment of the present invention.

FIG. 2 illustrates a block diagram of a circuit 200 for performing a display driving function and a fingerprint and touch detecting function according to a second embodiment of the present invention.

In comparison with the circuit 100, the circuit 200 has a shared pad P4. The operation of the circuit 200 is similar to the operation of the circuit 100. In other words, when the circuit 200 is operated under the display driving mode, three switches S1-S3 are controlled, such that an input terminal of the unity gain buffer amplifier 110 is coupled to a gamma circuit 20 and an output terminal of the unity gain buffer amplifier 110 is coupled to a display panel 10 via the shared pad P4. As shown in FIG. 2, the shared pad P4 is coupled to a source terminal of the transistor T1 of the display panel 10. A gate terminal of transistor T1 of the display panel 10 is controlled to receive a high voltage signal so as to turn on the transistor T1 when the circuit is operated under the display driving mode, and therefore the gray level voltage is stored in a capacitor C1 via the circuit 200 and the transistor T1, such that the circuit 200 is equivalent to a source driver to control the input image to be displayed on the display panel 10.

When the circuit 200 is operated under the fingerprint detecting mode, three switches S1-S3 are controlled, such that the input terminal of the unity gain buffer amplifier 110 is coupled to a fingerprint sensor 30 via the shared pad P4 and the output terminal of the unity gain buffer amplifier 110 is coupled to the ADC circuit 130. As shown in FIG. 2, the shared pad P4 is coupled to a source terminal of a select transistor T2 of the fingerprint sensor 30. The fingerprint sensor 30 is an active pixel sensor (APS) using the principle of optical detection. A photodiode PD1 produces a photo current proportional to the light intensity. The photo current is integrated on a sense capacitor C2. A source follower T3 buffers the voltage stored in the sense capacitor C2. A reset transistor T4 is used to reset the voltage stored in the sense capacitor C2. A gate terminal of the select transistor T2 is controlled to receive a high voltage signal so as to turn on the select transistor T2 when the circuit is operated under the fingerprint detecting mode, and therefore the voltage stored in the sense capacitor C2 is transmitted to the ADC circuit 130 via the unity gain buffer amplifier 110, such that the circuit 200 is equivalent to a fingerprint sensing circuit for recognizing fingerprint.

When the circuit 200 is operated under the touch detecting mode, three switches S1-S3 are controlled, such that the output terminal of the operational amplifier integrator 120 is coupled to the ADC circuit 130. As shown in FIG. 2, the pad P3 is coupled to a trace having a common voltage VCOM, in which the capacitor C1 is also coupled to the trace having a common voltage VCOM. In the second embodiment of the present invention, the unity gain buffer amplifier 110 and the shard pad P4 are shared when the circuit 200 is operated under the display driving mode and the fingerprint detecting mode, and the ADC circuit 130 and the digital processing circuit 140 are shared when the circuit 200 is operated under the fingerprint detecting mode and the touch detecting mode, and therefore the cost for manufacturing the circuit 200 for performing a display driving function and a fingerprint and touch detecting function could be decreased.

Figure 3A:
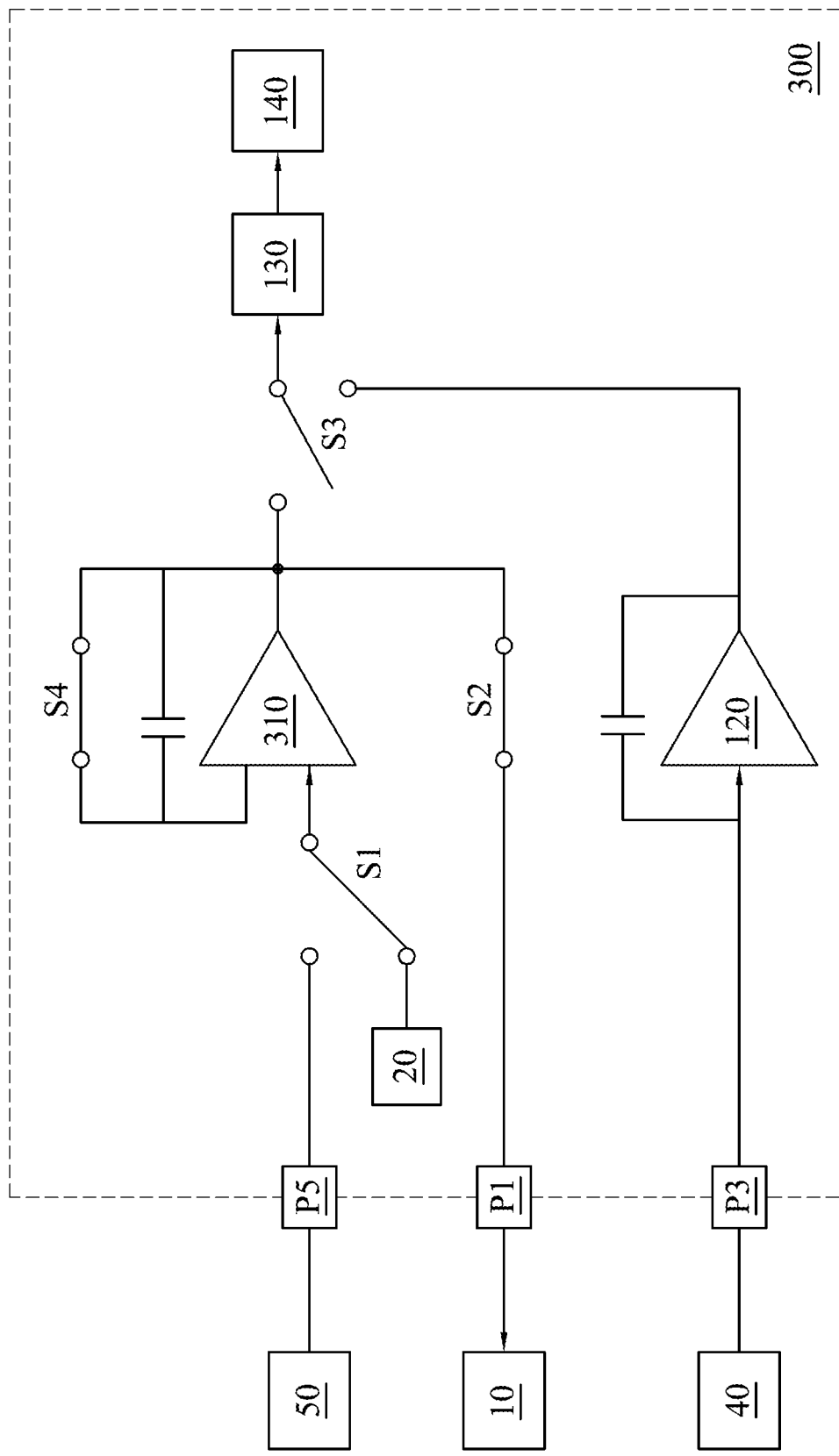
FIGS. 3a-3c illustrate block diagrams of a circuit for performing a display driving function and a fingerprint and touch detecting function according to a third embodiment of the present invention.
Figure 3B:
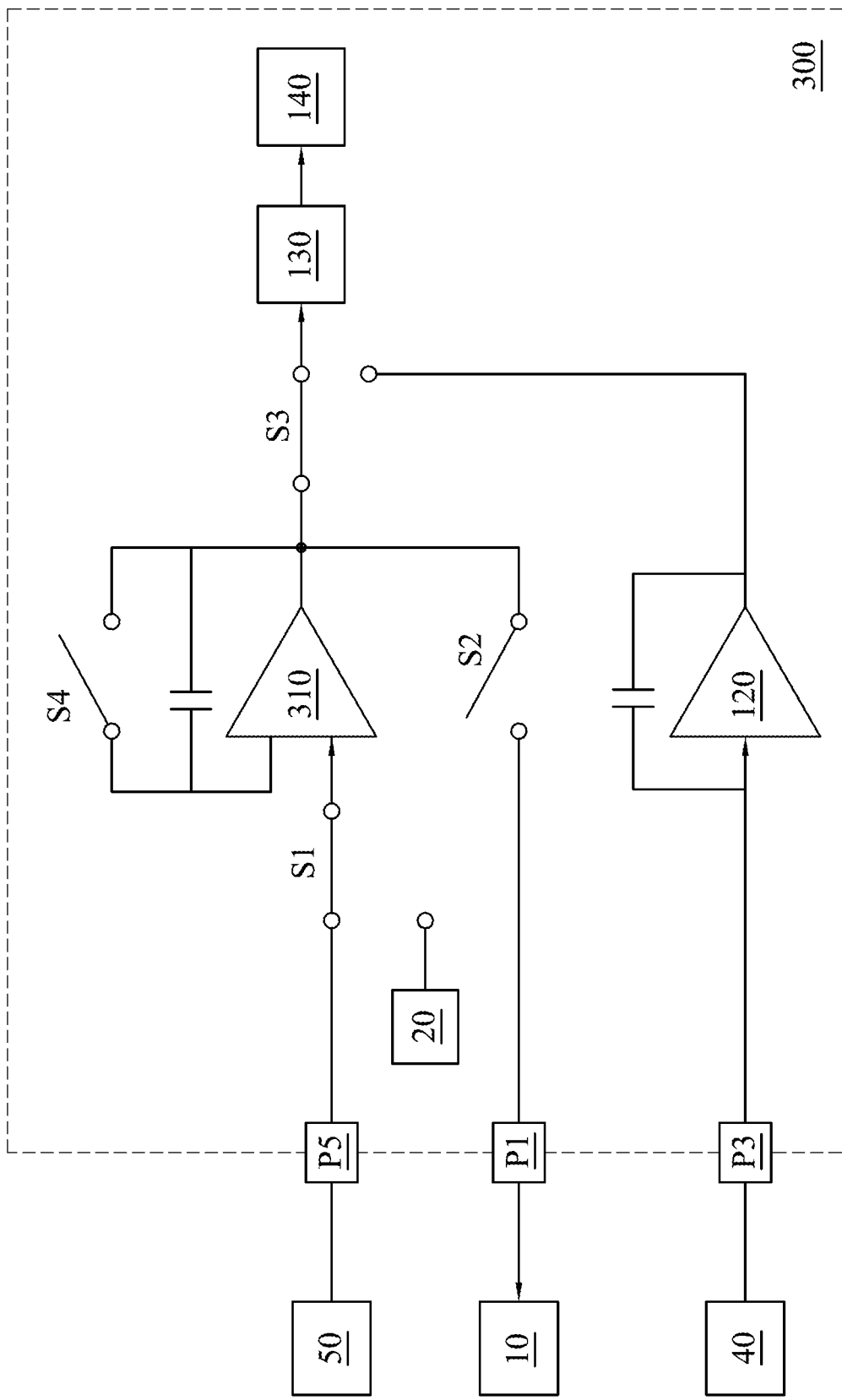
Figure 3C:
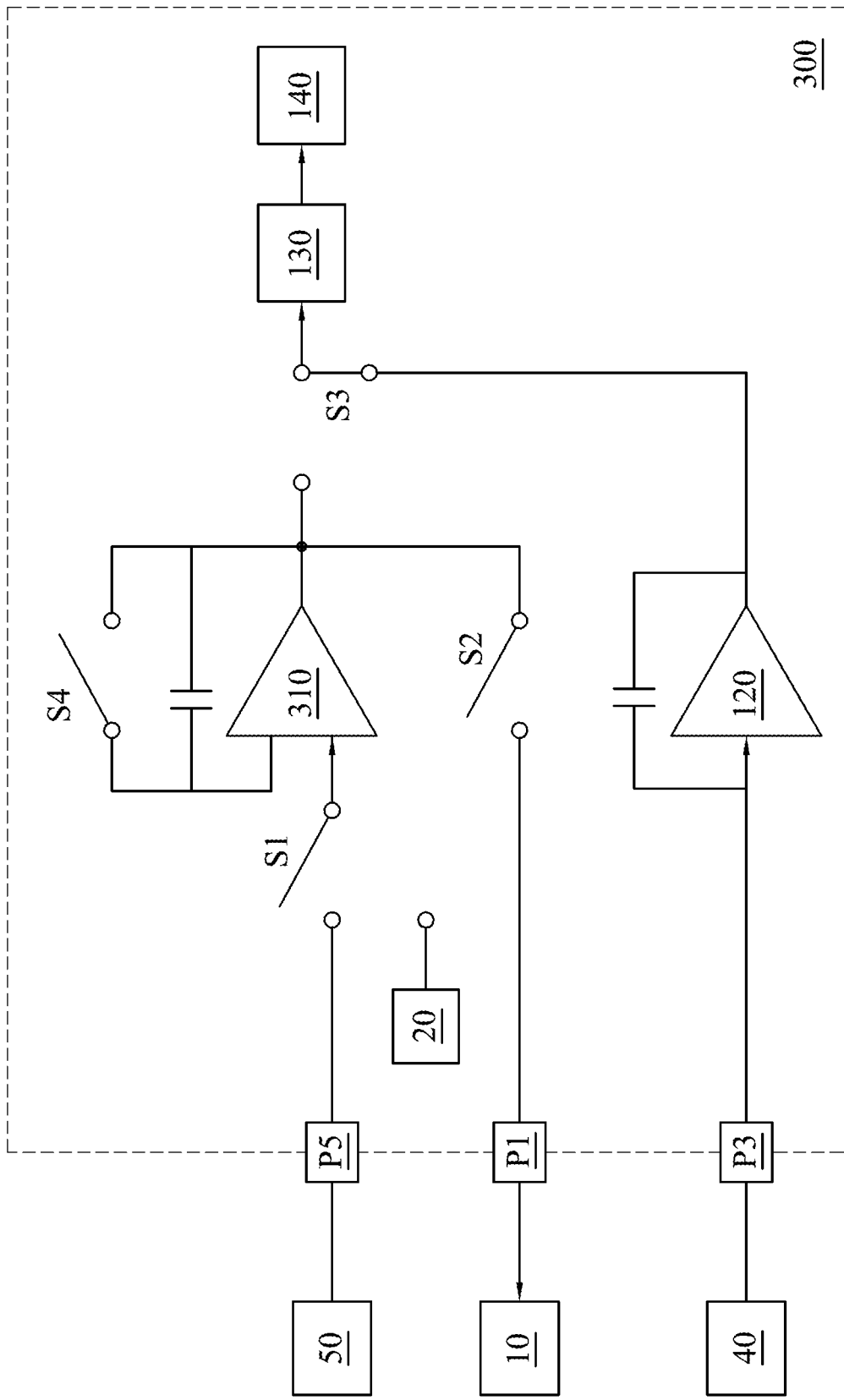

FIGS. 3a-3c illustrate block diagrams of a circuit 300 for performing a display driving function and a fingerprint and touch detecting function according to a third embodiment of the present invention. The circuit 300 includes an operational amplifier 310, the operational amplifier integrator 120, the ADC circuit 130, and the digital processing circuit 140 coupled to the ADC circuit 130.

FIG. 3a shows a connection diagram when the circuit 300 is operated under the display driving mode. As shown in FIG. 3a, when the circuit 300 is operated under the display driving mode, four switches S1-S4 are controlled, such that the operational amplifier 310 is formed as a unity gain buffer amplifier. In other words, when the circuit 300 is operated under the display driving mode, an input terminal of the said unity gain buffer amplifier is coupled to the gamma circuit 20 and an output terminal of the said unity gain buffer amplifier is coupled to the display panel 10 via the pad P1. The gamma circuit 20 provides the gray level voltage corresponding to the grayscale value of input image. Specifically, when the circuit 300 is operated under the display driving mode, the circuit 300 transmits the gray level voltage to a source terminal of one of transistors (not shown) of the display panel 10 via the said unity gain buffer amplifier, such that the circuit 300 is equivalent to a source driver to control the input image to be displayed on the display panel 10.

FIG. 3b shows a connection diagram when the circuit 300 is operated under the fingerprint detecting mode. As shown in FIG. 3b, when the circuit 300 is operated under the fingerprint detecting mode, four switches S1-S4 are controlled, such that the operational amplifier 310 is formed as an operational amplifier integrator. In other words, when the circuit 300 is operated under the fingerprint detecting mode, an input terminal of the said operational amplifier integrator is coupled to a fingerprint sensor 50 via a pad P5 and the output terminal of the said operational amplifier integrator is coupled to the ADC circuit 130. The fingerprint sensor 50 provides charges corresponding to a fingerprint of a user. Specifically, when the circuit 300 is operated under the fingerprint detecting mode, the said operational amplifier integrator converts the charges into voltages, and the ADC circuit 130 converts the said voltages to digital signals, and the digital processing circuit 140 receives and processes the digital signals, such that the circuit 300 is equivalent to a fingerprint sensing circuit for recognizing fingerprint.

FIG. 3c shows a connection diagram when the circuit 300 is operated under the touch detecting mode. As shown in FIG. 3c, an input terminal of the operational amplifier integrator 120 is coupled to the touch sensor 40 via the pad P3. The touch sensor 40 provides the stored charges corresponding to touch events. As shown in FIG. 3c, when the circuit 300 is operated under the touch detecting mode, four switches S1-S4 are controlled, such that an output terminal of the operational amplifier integrator 120 is coupled to the ADC circuit 130. Specifically, when the circuit 300 is operated under the touch detecting mode, the operational amplifier integrator 120 converts the stored charges into voltages, and the ADC circuit 130 converts the said voltages to digital signals, and the digital processing circuit 140 receives and processes the digital signals, such that the circuit 300 is equivalent to a touch controlling circuit for recognizing the touch events.

In the third embodiment of the present invention, the operational amplifier 310 is shared when the circuit 300 is operated under the display driving mode and the fingerprint detecting mode, and the ADC circuit 130 and the digital processing circuit 140 are shared when the circuit 300 is operated under the fingerprint detecting mode and the touch detecting mode, and therefore the cost for manufacturing the circuit 300 for performing a display driving function and a fingerprint and touch detecting function could be decreased.

Figure 4:
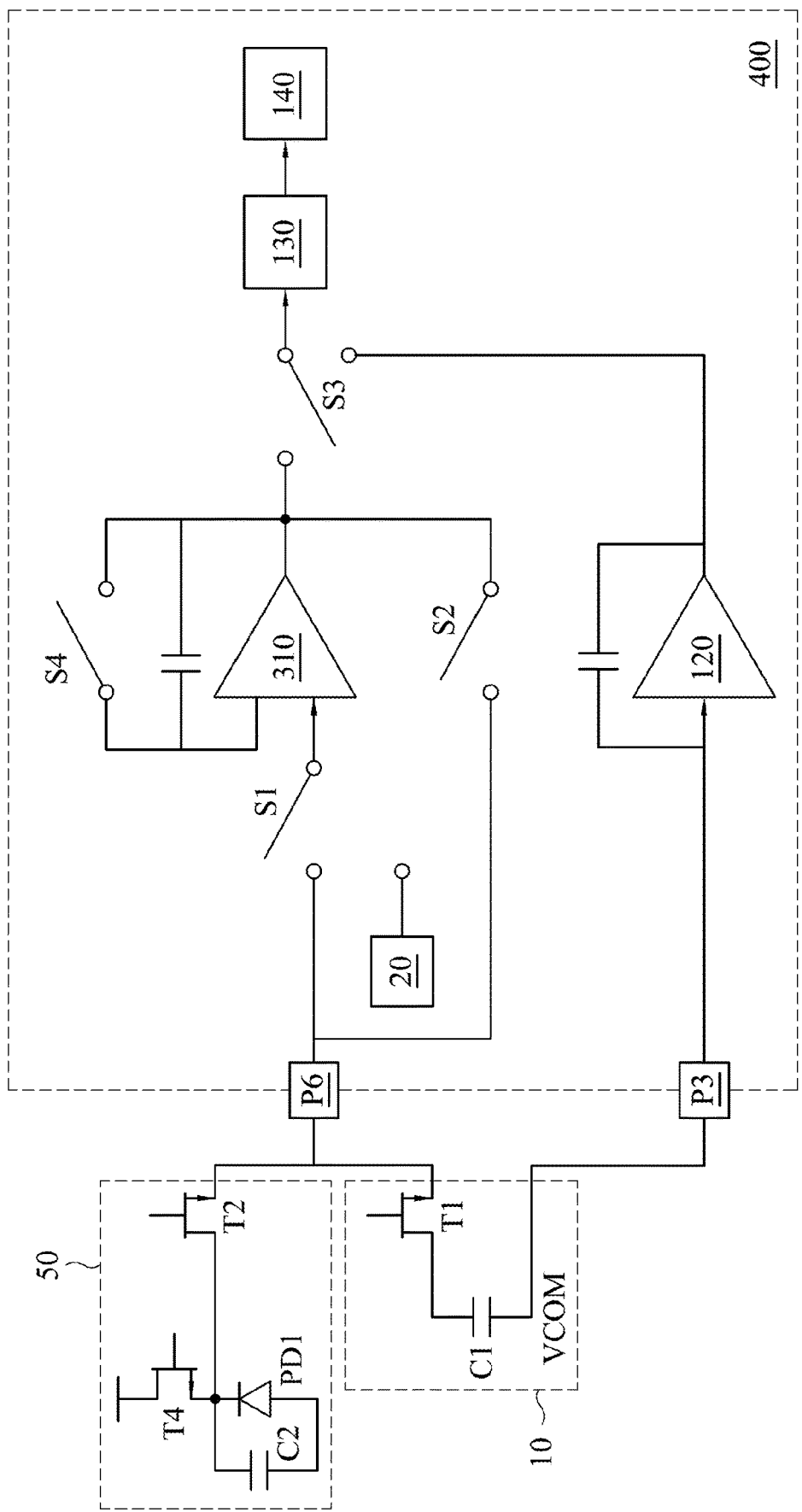
FIG. 4 illustrates a block diagram of a circuit for performing a display driving function and a fingerprint and touch detecting function according to a fourth embodiment of the present invention.

FIG. 4 illustrates a block diagram of a circuit 400 for performing a display driving function and a fingerprint and touch detecting function according to a fourth embodiment of the present invention.

In comparison with the circuit 300, the circuit 400 has a shared pad P6. The operation of the circuit 400 is similar to the operation of the circuit 300. In other words, when the circuit 400 is operated under the display driving mode, four switches S1-S4 are controlled, such that an input terminal of the operational amplifier 310 is coupled to a gamma circuit 20 and an output terminal of the operational amplifier 310 is coupled to a display panel 10 via the shared pad P6. As shown in FIG. 4, the shared pad P6 is coupled to a source terminal of the transistor T1 of the display panel 10. A gate terminal of transistor T1 of the display panel 10 is controlled to receive a high voltage signal so as to turn on the transistor T1 when the circuit is operated under the display driving mode, and therefore the gray level voltage is stored in a capacitor C1 via the circuit 400 and the transistor T1, such that the circuit 400 is equivalent to a source driver to control the input image to be displayed on the display panel 10.

When the circuit 400 is operated under the fingerprint detecting mode, four switches S1-S4 are controlled, such that the input terminal of the operational amplifier 310 is coupled to a fingerprint sensor 50 via the shared pad P6 and the output terminal of the operational amplifier 310 is coupled to the ADC circuit 130. As shown in FIG. 4, the shared pad P6 is coupled to a source terminal of a select transistor T2 of the fingerprint sensor 50. The fingerprint sensor 50 is a passive pixel sensor (PPS) using the principle of optical detection. A photodiode PD1 produces a photo current proportional to the light intensity. The photo current is integrated on a sense capacitor C2. A reset transistor T4 is used to reset the charges stored in the sense capacitor C2. A gate terminal of the select transistor T2 is controlled to receive a high voltage signal so as to turn on the select transistor T2 when the circuit is operated under the fingerprint detecting mode, and therefore the operational amplifier integrator formed by the operational amplifier 310 converts the charges stored in the sense capacitor C2 into voltages, and the ADC circuit 130 converts the said voltages to digital signals, and the digital processing circuit 140 receives and processes the digital signals, such that the circuit 400 is equivalent to a fingerprint sensing circuit for recognizing fingerprint.

When the circuit 400 is operated under the touch detecting mode, four switches S1-S4 are controlled, such that the output terminal of the operational amplifier integrator 120 is coupled to the ADC circuit 130. As shown in FIG. 4, the pad P3 is coupled to a trace having a common voltage VCOM, in which the capacitor C1 is also coupled to the trace having a common voltage VCOM. In the fourth embodiment of the present invention, the operational amplifier 310 and the shard pad P6 are shared when the circuit 400 is operated under the display driving mode and the fingerprint detecting mode, and the ADC circuit 130 and the digital processing circuit 140 are shared when the circuit 400 is operated under the fingerprint detecting mode and the touch detecting mode, and therefore the cost for manufacturing the circuit 400 for performing a display driving function and a fingerprint and touch detecting function could be decreased.

Figure 5A:
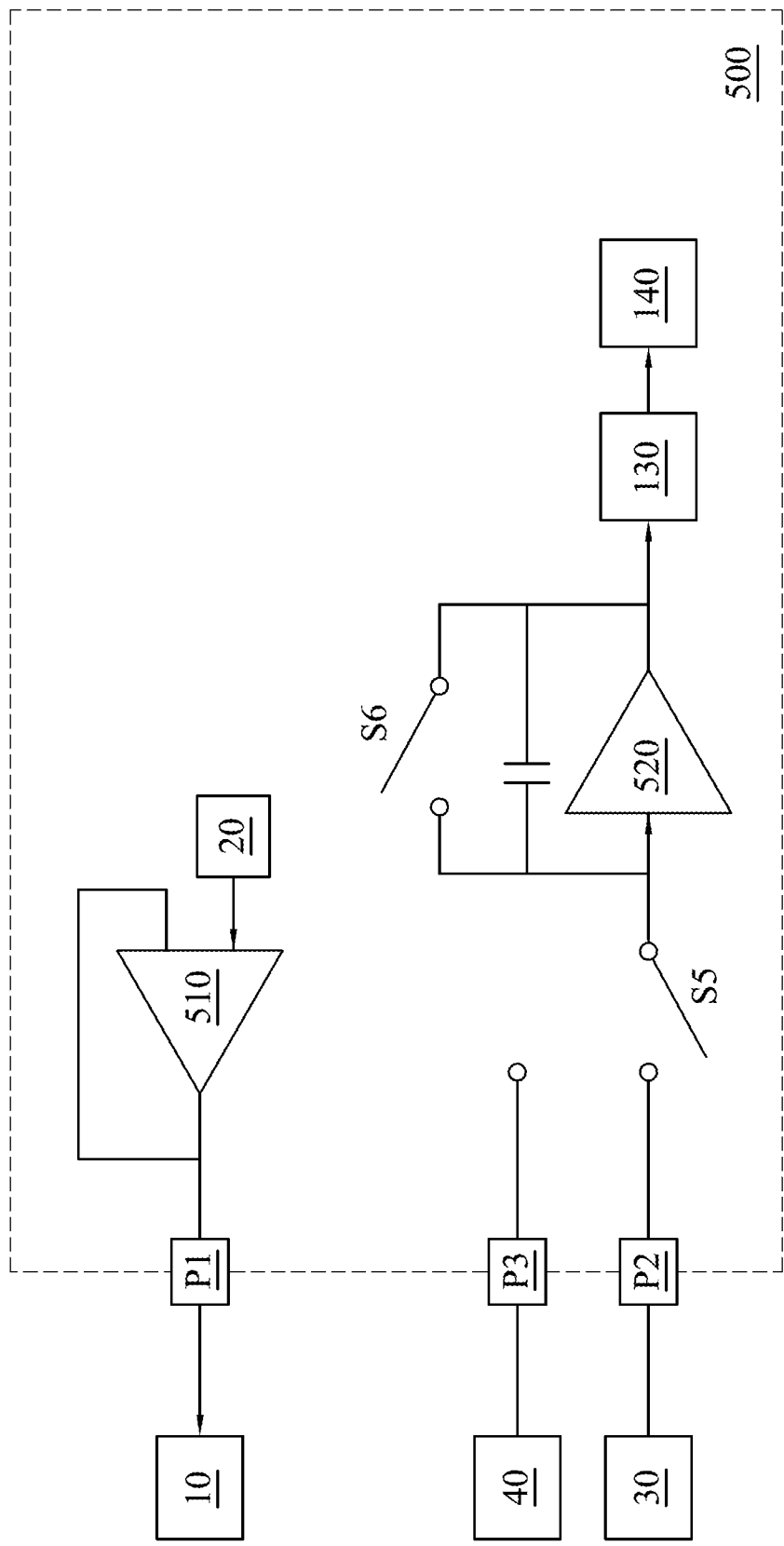
FIGS. 5a-5c illustrate block diagrams of a circuit for performing a display driving function and a fingerprint and touch detecting function according to a fifth embodiment of the present invention.
Figure 5B:
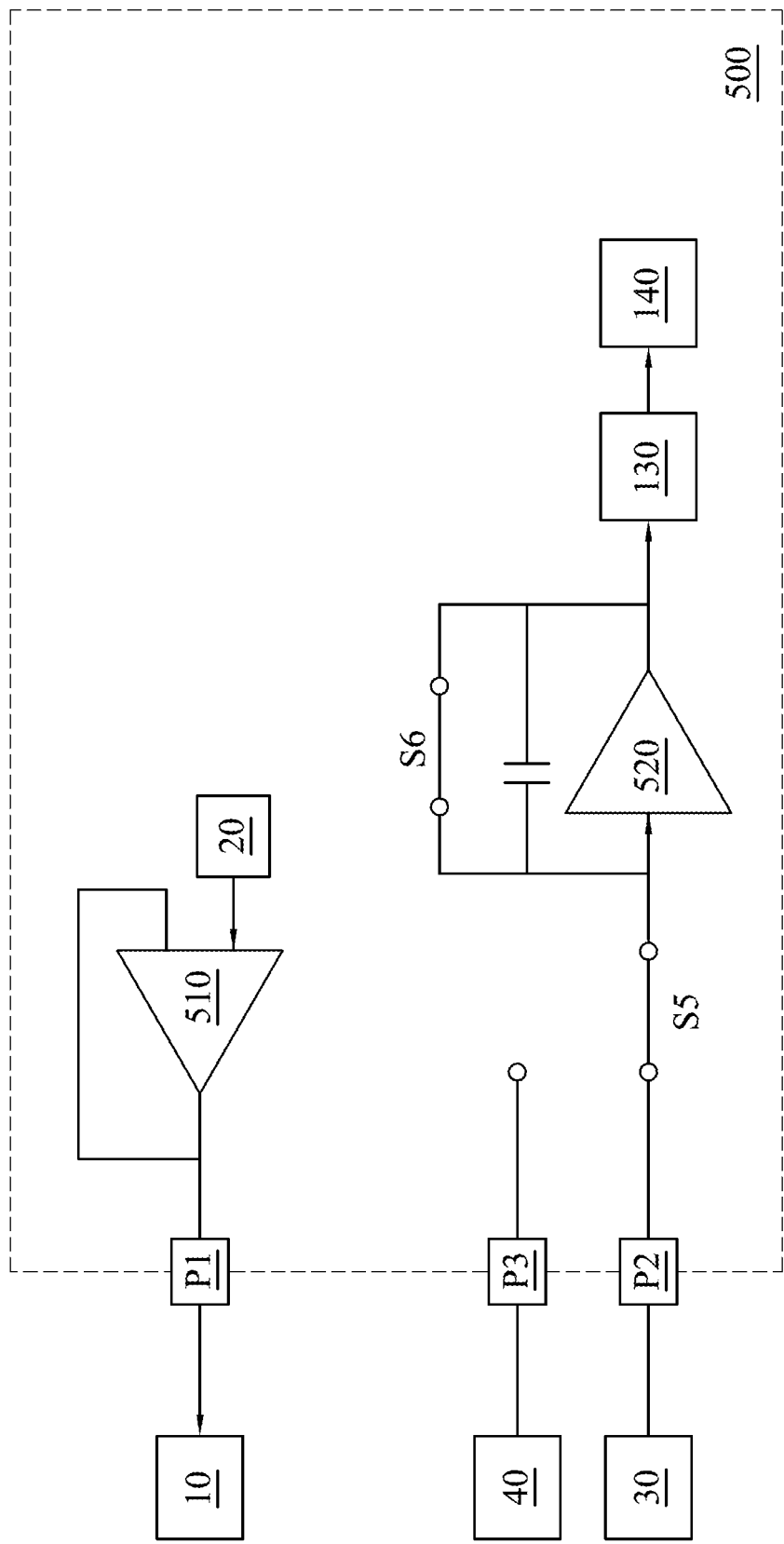
Figure 5C:
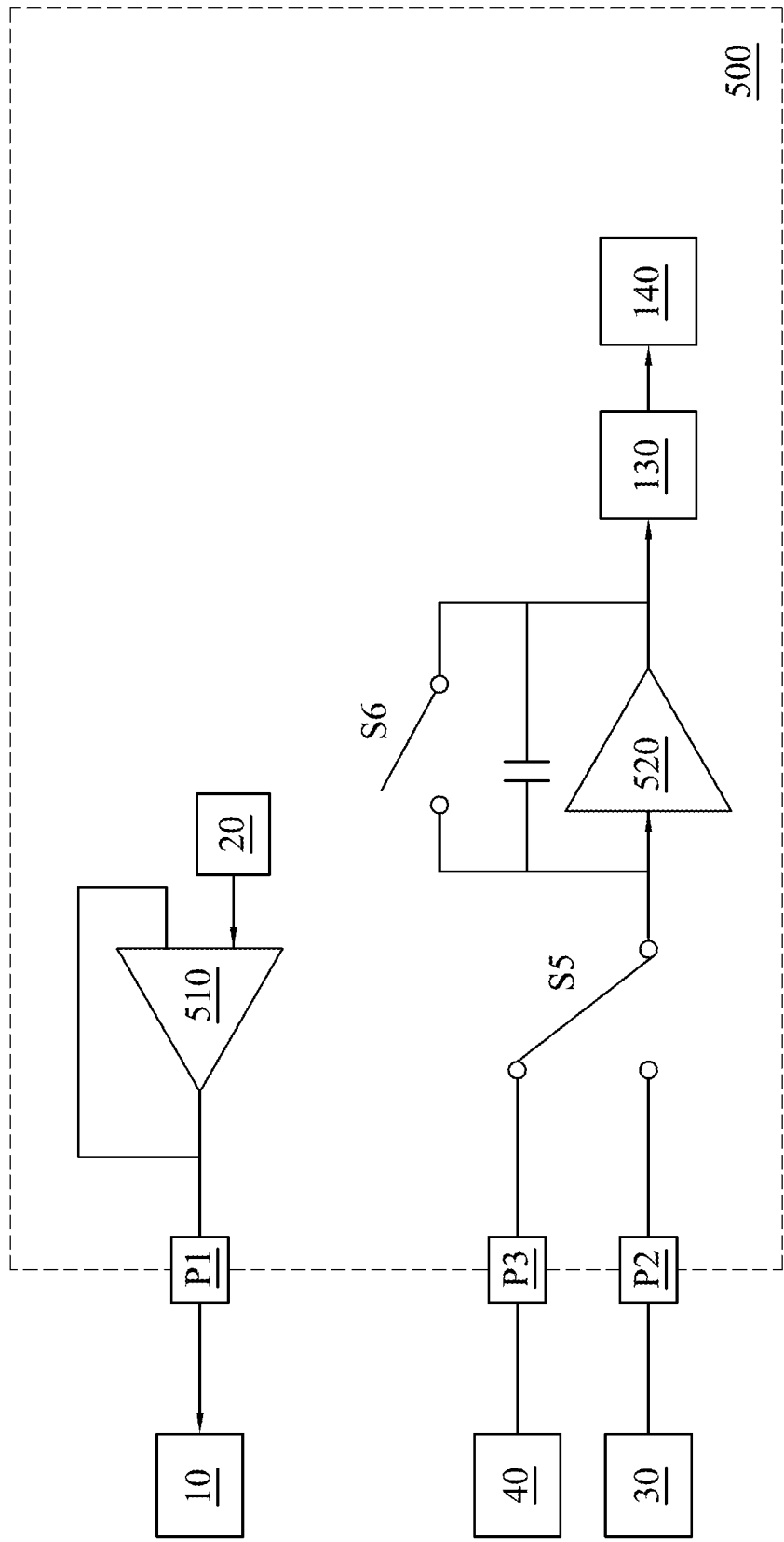

FIGS. 5a-5c illustrate block diagrams of a circuit 500 for performing a display driving function and a fingerprint and touch detecting function according to a fifth embodiment of the present invention. The circuit 500 includes a unity gain buffer amplifier 510, an operational amplifier 520, the ADC circuit 130, and the digital processing circuit 140 coupled to the ADC circuit 130.

FIG. 5a shows a connection diagram when the circuit 500 is operated under the display driving mode. As shown in FIG. 5a, when the circuit 500 is operated under the display driving mode, two switches S5-S6 are controlled to be turned off. An input terminal of the unity gain buffer amplifier 510 is coupled to the gamma circuit 20 and an output terminal of the unity gain buffer amplifier 510 is coupled to the display panel 10 via the pad P1. The gamma circuit 20 provides a gray level voltage corresponding to a grayscale value of input image. Specifically, when the circuit 500 is operated under the display driving mode, the circuit 500 transmits the gray level voltage to a source terminal of one of transistors (not shown) of the display panel 10 via the unity gain buffer amplifier 510, such that the circuit 500 is equivalent to a source driver to control the input image to be displayed on the display panel 10.

FIG. 5b shows a connection diagram when the circuit 500 is operated under the fingerprint detecting mode. As shown in FIG. 5b, when the circuit 500 is operated under the fingerprint detecting mode, the switch S5 is controlled to be coupled to the pad P2 and the switch S6 is controlled to be turned on, such that the operational amplifier 520 is formed as a unity gain buffer amplifier. In other words, when the circuit 500 is operated under the fingerprint detecting mode, the input terminal of the said unity gain buffer amplifier is coupled to a fingerprint sensor 30 via the pad P2 and the output terminal of the said unity gain buffer amplifier is coupled to the ADC circuit 130. The fingerprint sensor 30 which is an active pixel sensor (APS) provides voltages corresponding to a fingerprint of a user. Specifically, when the circuit 500 is operated under the fingerprint detecting mode, the circuit 500 transmits the said voltages from the fingerprint sensor 30 to the ADC circuit 130 via the said unity gain buffer amplifier, and the ADC circuit 130 converts the said voltages to digital signals, and the digital processing circuit 140 receives and processes the digital signals, such that the circuit 500 is equivalent to a fingerprint sensing circuit for recognizing fingerprint.

FIG. 5c shows a connection diagram when the circuit 500 is operated under the touch detecting mode. As shown in FIG. 5c, when the circuit 500 is operated under the touch detecting mode, the switch S5 is controlled to be coupled to the pad P3 and the switch S6 is controlled to be turned off, such that the operational amplifier 520 is formed as an operational amplifier integrator. In other words, when the circuit 500 is operated under the touch detecting mode, an input terminal of the said operational amplifier integrator is coupled to a touch sensor 40 via the pad P3 and the output terminal of the first operational amplifier integrator is coupled to the ADC circuit 130. The touch sensor 40 provides stored charges corresponding to touch events. Specifically, when the circuit 500 is operated under the touch detecting mode, the said operational amplifier integrator converts the stored charges into voltages, and the ADC circuit 130 converts the said voltages to digital signals, and the digital processing circuit 140 receives and processes the digital signals, such that the circuit 500 is equivalent to a touch controlling circuit for recognizing the touch events.

In the fifth embodiment of the present invention, the operational amplifier 520, the ADC circuit 130, and the digital processing circuit 140 are shared when the circuit 300 is operated under the fingerprint detecting mode and the touch detecting mode, and therefore the cost for manufacturing the circuit 500 for performing a display driving function and a fingerprint and touch detecting function could be decreased.

Figure 6:
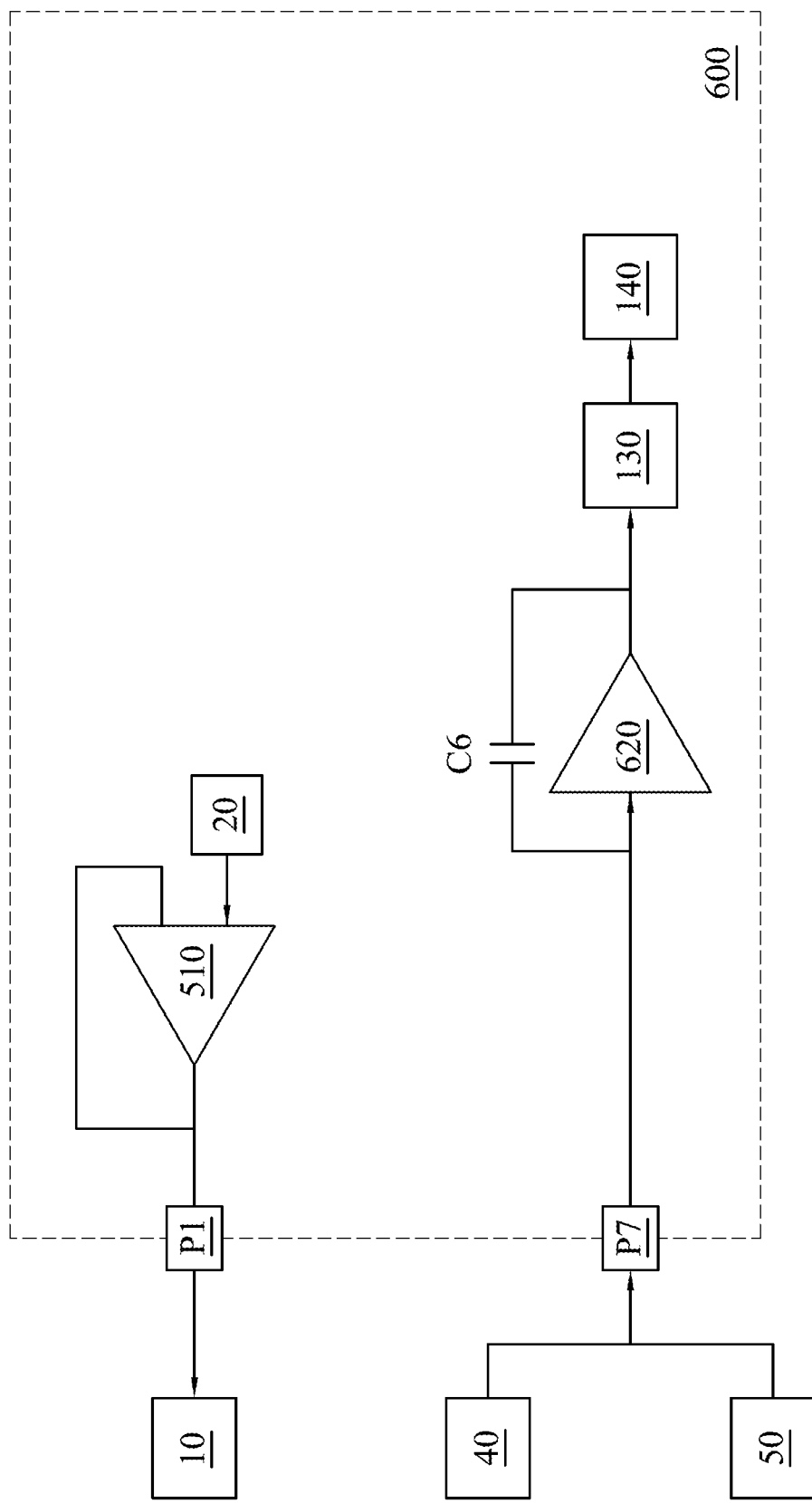
FIG. 6 illustrates a block diagram of a circuit for performing a display driving function and a fingerprint and touch detecting function according to a sixth embodiment of the present invention.

FIG. 6 illustrates a block diagram of a circuit 600 for performing a display driving function and a fingerprint and touch detecting function according to a sixth embodiment of the present invention. The circuit 600 includes the unity gain buffer amplifier 510, an operational amplifier 620, the ADC circuit 130, and the digital processing circuit 140 coupled to the ADC circuit 130. The operational amplifier 620 is formed as an operational amplifier integrator.

When the circuit 600 is operated under the display driving mode, the gamma circuit 20 provides a gray level voltage corresponding to a grayscale value of input image and the circuit 600 transmits the gray level voltage to a source terminal of one of transistors (not shown) of the display panel 10 via the unity gain buffer amplifier 510, such that the circuit 600 is equivalent to a source driver to control the input image to be displayed on the display panel 10.

As shown in FIG. 6, when the circuit 600 is operated under the fingerprint detecting mode, the input terminal of the operational amplifier integrator 620 is coupled to the fingerprint sensor 50 via a shared pad P7 and the output terminal of the said operational amplifier integrator is coupled to the ADC circuit 130. The fingerprint sensor 50 is the passive pixel sensor (PPS). The fingerprint sensor 50 provides charges corresponding to a fingerprint of a user. Specifically, when the circuit 600 is operated under the fingerprint detecting mode, the said operational amplifier integrator converts the said charges into voltages, and the ADC circuit 130 converts the said voltages to digital signals, and the digital processing circuit 140 receives and processes the digital signals, such that the circuit 600 is equivalent to a fingerprint sensing circuit for recognizing fingerprint.

As shown in FIG. 6, when the circuit 600 is operated under the touch detecting mode, the input terminal of the said operational amplifier integrator is coupled to the touch sensor 40 via a shared pad P7 and the output terminal of the said operational amplifier integrator is coupled to the ADC circuit 130. The touch sensor 40 provides the stored charges corresponding to touch events. Specifically, when the circuit 600 is operated under the touch detecting mode, the said operational amplifier integrator converts the stored charges into voltages, and the ADC circuit 130 converts the said voltages to digital signals, and the digital processing circuit 140 receives and processes the digital signals, such that the circuit 600 is equivalent to a touch controlling circuit for recognizing the touch events.

In the sixth embodiment of the present invention, the shared pad P7, the operational amplifier 620, the ADC circuit 130, and the digital processing circuit 140 are shared when the circuit 600 is operated under the fingerprint detecting mode and the touch detecting mode, and therefore the cost for manufacturing the circuit 600 for performing a display driving function and a fingerprint and touch detecting function could be decreased.

It is noted that the capacitance of a capacitor C6 coupled between the input terminal and the output terminal of the operational amplifier 620 is required to be adjusted when the circuit 600 is operated under the fingerprint detecting mode and the touch detecting mode. Specifically, the capacitance of the capacitor C6 when the circuit 600 is operated under the fingerprint detecting mode is much less than the capacitance of the capacitor C6 when the circuit 600 is operated under the touch detecting mode.

From the above description, the present invention provides several circuits for performing a display driving function and a fingerprint and touch detecting function. The electrical components of the circuits of the present invention are shared when the circuits are operated under different modes, and therefore the cost for manufacturing the circuits of the present invention could be decreased.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A circuit for performing a display driving function and a fingerprint and touch detecting function, comprising:
an operational amplifier, wherein the operational amplifier is controlled to be formed as a unity gain buffer amplifier and an input terminal of the unity gain buffer amplifier is controlled to receive a gray level voltage and an output terminal of the unity gain buffer amplifier is controlled to be coupled to a display panel when the circuit is operated under a display driving mode, wherein the operational amplifier is controlled to be formed as a first operational amplifier integrator and an input terminal of the first operational amplifier integrator is controlled to be coupled to a fingerprint sensor when the circuit is operated under a fingerprint detecting mode;
a second operational amplifier integrator, wherein an input terminal of the second operational amplifier integrator is coupled to a touch sensor;
an analog-to-digital converter (ADC) circuit, wherein an output terminal of the first operational amplifier integrator is controlled to be coupled to the ADC circuit when the circuit is operated under the fingerprint detecting mode, wherein an output terminal of the second operational amplifier integrator is controlled to be coupled to the ADC circuit when the circuit is operated under a touch detecting mode; and
a digital processing circuit coupled to the ADC circuit.

2. The circuit of claim 1, wherein the fingerprint sensor is a passive pixel sensor (PPS).

3. The circuit of claim 1, wherein when the circuit is operated under the display driving mode, the circuit is equivalent to a source driver for transmitting the gray level voltage to a source terminal of one of transistors of the display panel via the unity gain buffer amplifier.

4. The circuit of claim 1, wherein when the circuit is operated under the fingerprint detecting mode, the first operational amplifier integrator converts charges from the fingerprint sensor into voltages, and the ADC circuit converts the said voltages into digital signals for recognizing fingerprint.

5. The circuit of claim 1, wherein when the circuit is operated under the touch detecting mode, the second operational amplifier integrator converts charges from the touch sensor into voltages, and the ADC circuit converts the said voltages into digital signals for recognizing touch events.

6. The circuit of claim 1, further comprising:
a shared pad, wherein the shared pad is controlled to be coupled to the output terminal of the unity gain buffer amplifier when the circuit is operated under the display driving mode, wherein the shared pad is controlled to be coupled to the input terminal of the first operational amplifier integrator when the circuit is operated under the fingerprint detecting mode.

7. The circuit of claim 6, wherein the shared pad is coupled to a source terminal of one of transistors of the display panel and a source terminal of a select transistor of the fingerprint sensor, wherein a gate terminal of the one of the transistors of the display panel is controlled to receive a high voltage signal when the circuit is operated under the display driving mode, wherein a gate terminal of the select transistor of the fingerprint sensor is controlled to receive the high voltage signal when the circuit is operated under the fingerprint detecting mode.

* * * * *